United States Patent [19]

Noneman et al.

[11] Patent Number: 5,572,213
[45] Date of Patent: Nov. 5, 1996

[54] PARAMETER ENCODER ARCHITECTURE

[75] Inventors: Mark E. Noneman, Ramona; Donald A. Porter; Donald L. Lochhead, both of San Diego, all of Calif.

[73] Assignee: TRW Inc., Redondo Beach, Calif.

[21] Appl. No.: 438,232

[22] Filed: May 9, 1995

Related U.S. Application Data

[63] Continuation of Ser. No. 154,909, Nov. 19, 1993, abandoned.

[51] Int. Cl.$^6$ ............................................. G01S 7/292
[52] U.S. Cl. ............................................................ 342/13
[58] Field of Search ............................ 342/13, 192, 16; 455/133, 303

[56] References Cited

U.S. PATENT DOCUMENTS

| | | | |
|---|---|---|---|
| 4,652,879 | 3/1987 | Rudish et al. | 342/371 |
| 4,996,532 | 2/1991 | Kirimoto et al. | 342/81 |
| 5,121,413 | 6/1992 | Voegtly et al. | 375/342 |
| 5,451,956 | 9/1995 | Lochhead | 342/13 |
| 5,477,227 | 12/1995 | Noneman | 342/13 |

*Primary Examiner*—Daniel T. Pihulic

[57] ABSTRACT

A channelized receiver having multiple sectors wherein each antenna of said receiver system is electronically connectable to any combination of sectors to improve the flexibility of said receiver. The bandwidth of each sector is electronically selectable adding further flexibility to the receiver mission. The signal characteristics of time of arrival, pulse amplitude and time of departure are processed digitally in real time and false pulses are eliminated through arbitration in real time. Remaining pulse calculations such as angle of arrival, frequency, pulse width and pulse repetition interval and environment filtering are not calculated in real time.

28 Claims, 4 Drawing Sheets

PARAMETER ENCODER ARCHITECTURE

This is a continuation of U.S. patent application Ser. No. 08/154,909, filed Nov. 19, 1993 and now abandoned.

FIELD OF THE INVENTION

This invention relates to the architecture of an RF channelized receiver capable of detecting multiple RF pulses of varying amplitude and frequency in multiple bandwidths and sectors. The configuration of the sectors is programmable so that one sector can have 24, 48, 72 or 96 individual channels to cover a programmable bandwidth.

CROSS REFERENCE TO RELATED APPLICATIONS

This application is related to U.S. Ser. No. 08/109,804, filed on Aug. 20, 1993 entitled "Instantaneous Parameter Measuring Receiver", now U.S. Pat. No. 5,451,956 issued Sep. 19, 1995; U.S. Ser. No. 08/443,174 filed May 3, 1995 entitled "Advanced Parameter Encoder with Dual Integrated Pulse Present Detection and Channel/Sector Arbitration", which is a continuation-in-part application of Ser. No. 08/154,906 filed Nov. 19, 1993, now abandoned; U.S. Ser. No. 08/478,155 filed Jun. 7, 1995 entitled "Advanced Parameter Encoder with Pulse-On-Pulse Detection and Pulse Fragment Reconstruction" which is a continuation-in-part of U.S. patent application Ser. No. 08/154,908, filed Nov. 19, 1993, now abandoned; and U.S. Ser. No. 08/154,907 filed Nov. 19, 1993 entitled "Advanced Parameter Encoder with Environmental Filter Capability", now U.S. Pat. No. 5,477,227 issued Dec. 19, 1995, all of which are hereby incorporated by reference.

BACKGROUND OF THE INVENTION

Electronic warfare systems are used on modern military aircraft as part of their offensive and defensive capabilities. These electronic warfare systems emit RF signals that travel through space. Radar systems use RF emissions to locate and track opposing aircraft and some radar systems are incorporated within missiles to assist in the self-guided propulsion of a missile to its target. An electronic warfare search receiver is used defensively to detect those RF emissions. The receiver searches the range of frequencies (the RF spectrum) in which the RF emissions are likely to occur. The receiver then detects and analyzes the nature of the RF signals. By determining the characteristics of the signals received, the defender will know the nature of the threat and, for example, will know if a radar guided missile has "locked on" to the defenders aircraft. These systems are used in friendly as well as unfriendly aircraft. In a tactical or strategic environment, the number of aircraft and the density and diversity of the emissions in the RF spectrum is quite large and is expected to increase. Existing and future aircraft and other platforms need advanced capability avionics in order to successfully perform and survive on future missions. There will be more electromagnetic emitters from friendly, allied and enemy sources and all of these sources must be detected, analyzed and sorted. These RF receivers need to be more available (longer mean time between failure) then ever before so that the equipment will perform on every mission because success can only be achieved if the aircraft has operating equipment.

Channelized receivers are recognized as a preferred solution to provide very high probability of intercept even in extremely high density environments. They provide wide instantaneous bandwidth while maintaining dynamic range, high frequency resolution and direction finding capabilities. The channelized receiver achieves this performance by paralleling many narrow bandwidth receivers together into a coherent whole. However, true channelized receivers (processing the entire instantaneous bandwidth simultaneously) have generally been impractical to date. The RF and digital circuitry required to process 100 "receivers" is too large and heavy and consumes too much power.

A small, lightweight, low power channelized receiver is needed to meet the needs of future tactical aircraft, helicopters and surveillance platforms. Also, a small channelized receiver is crucial for upgrading the electronic warfare (EW) capabilities of existing aircraft.

It is unlikely that a single receiver type will be capable of meeting all offensive or defensive threat detection and analysis requirements dictated by the future electronic warfare environment. Instead a set of search and analysis receivers of complimentary capabilities are likely to be required to meet future demands. Trade offs between probability of intercept, bandwidth, simultaneous signal resolution, sensitivity, receiver complexity and power consumption are necessary. It would be advantageous to have a small lightweight, low power channelized receiver. Such a receiver could process signals digitally in real time and have the flexibility of being programmable so that various portions of the channelized receiver can be used for multiple purposes. In such a receiver it would useful to have the ability to eliminate all spurious signals while maintaining a high probability of intercepting real signals.

SUMMARY OF THE INVENTION

The invention is a method and architecture for building a small, lightweight and low power channelized receiver in which the analog RF information is converted to digital signals before processing. Analog sections of the channelized receiver such as an IF switch, the tuners and the channelizers are digitally controllable so that they can be electronically reconfigured to cover multiple sectors with electronically selectable bandwidth. The overall system is capable of measuring the signal parameters of RF pulses including frequency, time of arrival, pulse width, pulse amplitude and angle of arrival. To assist in identifying these pulse parameters, the present invention employs real time conversion of the log video signal to a digital signal which detects time of arrival (TOA), pulse amplitude (PA) and time of departure (TOD) of a pulse in real time. The receiver also has the capability of arbitrating between frequency channels and sectors in real time so that spurious signals can be eliminated in real time before pulse calculations such as angle of arrival, (AOA), frequency (F), pulse width (PW) and pulse repetition interval (PRI) can be calculated in non-real time. There are, for example, a total of 96 separate programmable channels in the system so that each channel in the channelized receiver has the capability of simultaneously processing individual signals in each channel and determining TOA, PA and TOD for each received signal. This aspect of the invention is accomplished by employing digital techniques that require low power consumption and more importantly that are programmable so that the function of the receiver can be changed electronically to meet the challenge of different mission requirements. The programmable nature of the receiver gives each channel the ability to look at a selectable bandwidth in addition to the ability to look for multiple types of pulses. In the spatial domain a receiver system may, for example, have four antennas each covering one sector or quadrant of space. However, because the sectors of the receivers are programmable, they can be electronically reconfigured so that the entire bandwidth capabilities of the receiver could be connected to one antenna giving that sector a large bandwidth coverage.

Therefore, it is an object of the present invention to provide a channelized receiver, with a capability of detecting and differentiating between RF pulses, that is small, lightweight and has low power consumption. It is another object of the present invention to be able to digitally process the log video signals so that TOA, PA and TOD can be calculated in real time. It is another object of the invention to provide a receiver architecture employing channel and sector arbitration so that spurious signals can be eliminated from the data stream in real time thereby greatly reducing the amount of information upon which the calculations of AOA, F, PW and PRI are calculated. It is another object of the invention to provide modular expandability so that additional bandwidth (channels) and/or spatial coverage (sectors) can be added without altering the basic architecture of the receiver system. It is a further object of the present invention to provide a receiver architecture in which the sectors and bandwidth of the receiver are electronically programmable which will greatly increase receiver flexibility to meet varying mission requirements.

The foregoing objects and advantages of the invention together with the structure and characteristics thereof, briefly summarized in the foregoing passages, become more apparent to those skilled in the art upon reading the detailed description of the preferred embodiment taken together with the following illustrations.

DETAILED DESCRIPTION OF THE PREFERRED EMBODIMENT

The present invention is the architecture of a channelized receiver that converts a log video RF signal to digital information that is used to detect received RF pulses and to discriminate between real and spurious signals occurring in both the frequency and space domain. The processing of the pulses is all done digitally in real time for TOA, PA and TOD. Discriminating between real and spurious signals is also performed in real time. These features allow processing of information from 96 separate receiver channels each of which is responsible for monitoring its assigned bandwidth in its sector.

Figure 1:
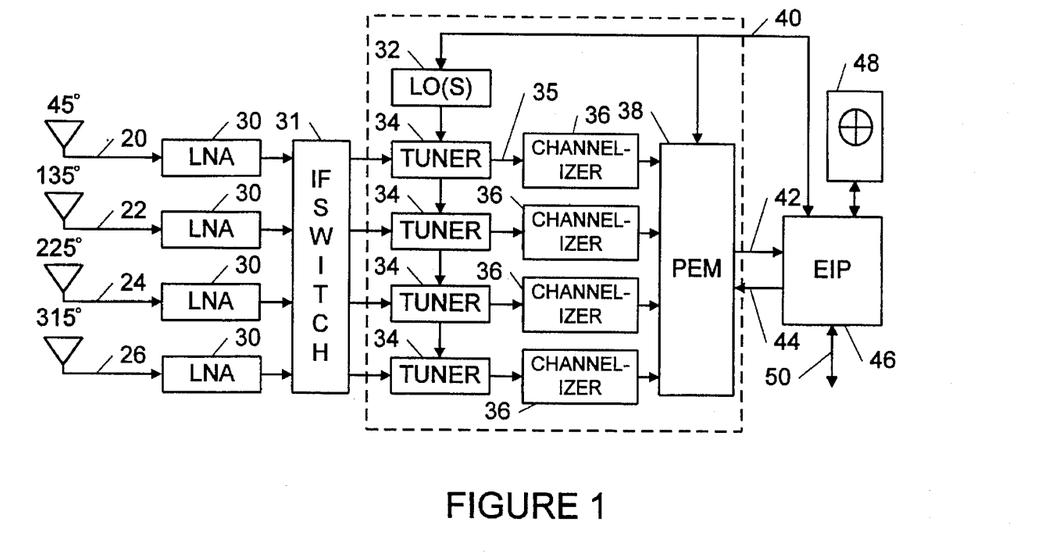
FIG. 1 is a simplified block diagram of an overall channelized receiver system.

FIG. 1 is an overall block diagram of a channelized receiver that would be employed in an aircraft to receive, detect and analyze RF signals from a variety of possible emission sources including enemy aircraft, enemy missiles and fixed radar locations.

Turning now to FIG. 1, FIG. 1 is a block diagram of a channelized receiver in which the present invention can be used. This is an illustration of the type of receiver that would be suitable for the present invention although the present invention can be used in other types of receivers such as narrow band single-channel and interferometer receivers. Antennas 20, 22, 24 and 26 represent the four antennas that would typically be used to cover 360° of spatial domain surrounding an aircraft. Each antenna receives signals from approximately 90° of azimuth air space to cover the entire 360° range. The receivers 30 are identical and receive the signals intercepted by antennas 20–26. The receivers 30 are typically wide band, front end low noise amplifiers that are placed close to the antennas to minimize noise interference that could be introduced through long cable connections. Bus 40 is a command and control bus that is used to coordinate, control and reconfigure the overall function of the channelized receiver. Each output of the receiver is connected to an IF matrix switch 31 and then to a tuner 34. Local oscillator 32 is connected to each of the tuners 34 to provide the tuners with the ability to select IF frequency bands and down convert a bandwidth from, for instance, 6 to 7 gigahertz for an individual receiver to 0.5–1.5 gigahertz. The output bandwidth of each tuner 34 is connected to one of the four channelizers 36. The channelizers 36 consist of a number of adjacent band-pass filters that are used to discriminate between signals that may be contained in various frequencies across the spectrum selected by the IF tuner. Each of these band-pass filters can cover a frequency range of from, for example, 20 to 100 MHz and typically will have a crossover with its adjacent filter at −1 dB of attenuation. The outputs of the channelizers are connected to the parameter encoder module 38 which is ultimately responsible for producing a pulse descriptor word for each separate signal that has been received across the frequency spectrum. The pulse descriptor word (PDW) which is a long digital word describing the individual characteristics of each received signal is transferred to an emitter identification processor 46 that determines the nature and possible significance of any signal that is received. The emitter identification processor 46 then transfers information concerning the received signal to a cockpit display 48, for instance, or via line 50 to an aircraft controller. FIG. 1 is intended to identify an overall system in which the present invention is useful.

Figure 2:
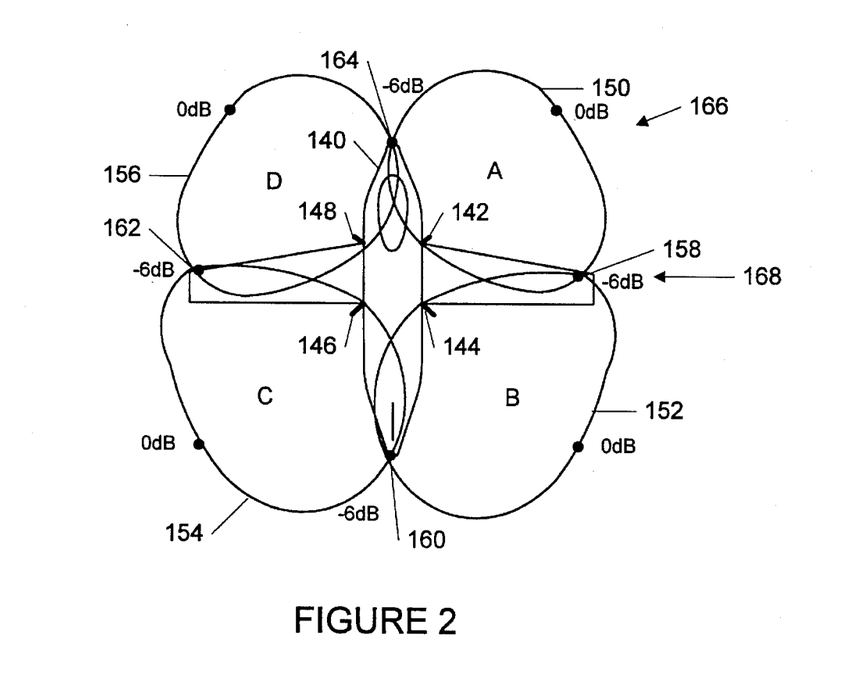
FIG. 2 is a diagram showing four sectors of a channelized receiver as they could be mounted on an airplane.

FIG. 2 shows airplane 140 having antennas 142, 144, 146 and 148. Antenna 142 has reception zone 150 which corresponds to one quadrant or sector. This sector is referred to as Sector A. Similarly, antennas 144, 146 and 148 have reception zones 152, 154 and 156 respectively. These reception zones are respectively referred to Sectors B, C and D. Sector A has a −6 dB crossover point with its neighboring sectors D and B identified as −6 dB crossover points 164 and 158. In a similar manner, Sector B has −6 dB crossover points with its neighboring Sectors A and C. These are crossover points 158 and 160. Sector C has −6 dB crossover points 160 and 162 with its respective neighboring Sectors B and D and Sector D has −6 dB crossover points 162 and 164 with its neighboring Sectors C and A. With the antennas arranged in this manner, the airplane can detect incoming RF signals in a 360° range. The antennas 142, 144, 146 and 148 correspond to the antennas 20, 22, 24 and 26 respectively shown in FIG. 1. Arrow 166 represents an incoming RF signal that will impact Sector A at the zero dB point or bore sight. Arrow 168 also represents an incoming RF signal that will impact Sectors A and B at the −6 dB crossover point 158 resulting in identical signals received in Sectors A and B. When the RF signal represented by arrow 166 is received by Sector A, a portion of the energy from that RF signal will also be received by Sectors D, B and C. Since there is only one signal, an arbitration must take place to determine which signal is the best signal to report. Similarly, when an RF signal is being received from a point represented by arrow 168, the system should only report one signal instead of reporting two. Discriminating between RF signals received in the various sectors is accomplished through sector arbitration which is done digitally in real time.

Figure 3:
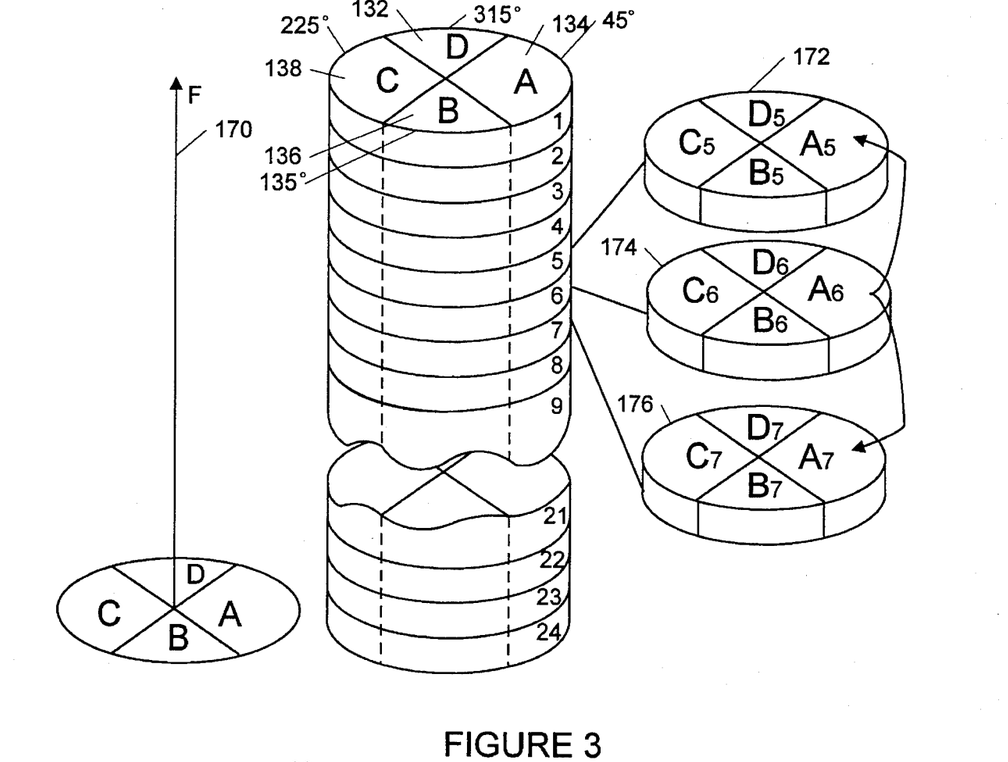
FIG. 3 is a diagram showing the relationship between sectors and channels in a channelized receiver.

Sectors A, B, C and D shown in FIG. 2 are also represented in FIG. 3 by the cylindrical diagram which has been divided into sectors with each sector having 24 channels, for example, the Sectors A, B, C and D in FIG. 3 correspond to the Sectors A, B, C and D in FIG. 2. As shown in FIG. 3, Sector A numbered 134 has 24 channels. Sector B numbered 136 has 24 channels as do Sectors C and D respectively numbered 138 and 132. As shown in diagram 170 in FIG. 3, each of the channels in Sectors A, B, C and D is responsible for detecting signals in a selected frequency band. Therefore, each of the Sectors A, B, C and D is capable of listening to 24 individual frequency bands. Three of those frequency bands are shown in breakaway sections 172, 174 and 176 which correspond to the three channels 5, 6 and 7. Each of these channels have the same circuitry which includes a band-pass filter, a log video detection amplifier, an AD converter, pulse detection, arbitration and pulse measurement. In total there are 96 channels or 24 channels in each sector. When a signal is received by channel $A_6$, rabbit-ear signals will also be received in channels $A_5$ and $A_7$ which are adjacent in frequency to channel $A_6$. The rabbit-ear signals received in channels $A_5$ and $A_7$ are not true signals and are rejected by employing arbitrations between channels $A_6$ and $A_7$ and $A_6$ and $A_5$. The arbitration involves integrating the amplitude of a predetermined number of amplitude samples occurring after the arrival of the pulses and then comparing those amplitude samples to the samples in the adjacent channels. The signal with the largest amplitude wins and the other signals are rejected and not reported in a PDW. This is accomplished in real time and allows the receiver to eliminate a great deal of spurious information before the steps of calculating the AOA, PW, F and PRI of a true signal. The ability to arbitrate between channel $A_6$ and $A_5$ and $A_7$ in real time is a result of digital processing techniques. It would not be feasible to perform these arbitrations simultaneously in real time in 96 channels if the log video RF signal was not first converted to digital information. A similar arbitration is also performed between each of the sectors $A_6$, $B_6$, $C_6$ and $D_,$. Sector arbitration is accomplished in the same way as channel arbitration except that sector arbitration takes place between each of the sectors instead of just with adjacent neighbors as in channel arbitration. The specific method of accomplishing this arbitration is disclosed in the application "Advanced Parameter Encoder with Dual Integrated Pulse Present Detection and Channel/Sector Arbitration" which has been incorporated herein by reference. A further aspect of the present invention will now be described with reference to FIGS. 4 and 5.

Figure 4:
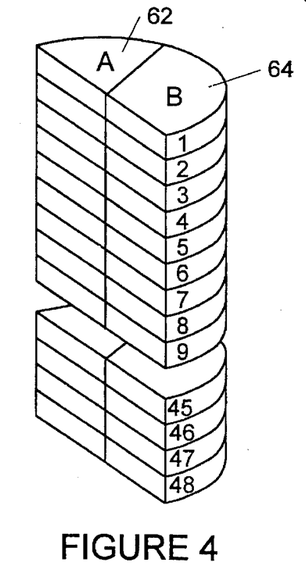
FIGS. 4 and 5 are diagrams showing how sectors of adjacent channels can be arranged.

In FIG. 4, Sector A has been numbered 62 and Sector B has been numbered 64. As shown in FIG. 4, each of the Sectors A and B now has 48 adjacent channels to cover the frequency spectrum. This realignment of the reception ability of the receiver is accomplished electronically in IF switch 31 shown in FIG. 1. In this instance, antenna 20 could be electronically connected through IF switch 31 to two of the tuners 34 and another antenna 22 could be electronically connected to the remaining two tuners 34. The tuners 34 would then select the contiguous frequency bandwidths which would be transmitted to the 48 receiver channels available to each antenna. In this instance, if it was known that a particular threat would be on the right side of the aircraft, Sectors A and B could cover 180° on the right side of the aircraft with a drastically increased frequency detection bandwidth. Again, this ability to switch bandwidth and receiver channels between sectors greatly adds to the receiver flexibility and mission capability of the present invention.

Figure 5:
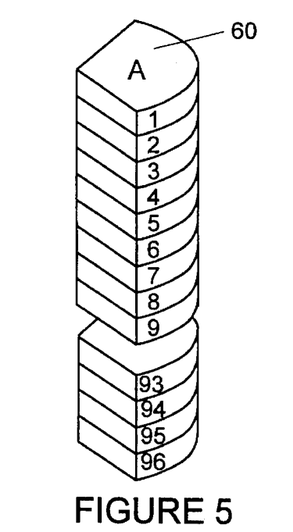

In FIG. 5, Sector A has been numbered 60 and represents channels 1–96. In this instance, antenna 20 has been electrically connected through IF switch 31 to all four of the tuners 34. The tuners 34 select the contiguous frequency bands of interest and then down convert. All 96 channels of the receiver are connected to one antenna. This allows the airplane to monitor a vast frequency spectrum in one quadrant which could be useful in situations such as detection of frequency agile signals. The receiver can be just as easily switched back to a 360° reception mode by electrically manipulating the connections in IF switch 31.

Figure 6:
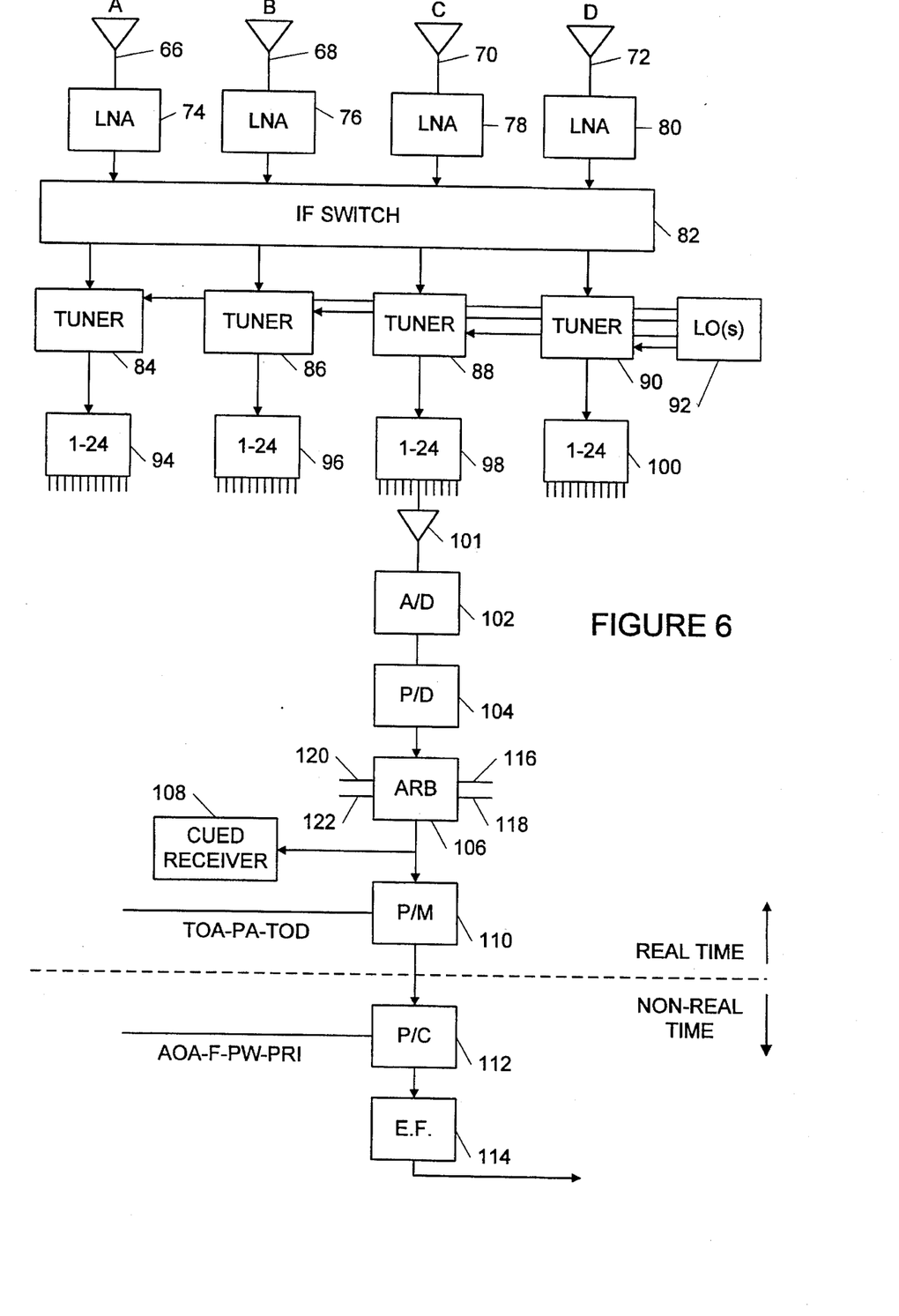
FIG. 6 is an overall block diagram showing the architecture of the channelized receiver of the present invention.

FIG. 6 is a detailed block diagram showing the novel architecture of the present invention and its implementation in a channelized receiver. Antennas 66, 68, 70 and 72 are connected respectively to the wide band, front-end, frequency converters 74, 76, 78 and 80 respectively. Attempts are made to keep a short distance between the inputs of the amplifiers 74, 76, 78 and 80 and their respective antennas 66, 68, 60 and 72 to eliminate noise problems that may occur due to long cable connections. This has the effect of reducing the noise floor and increasing receiver sensitivity. The outputs of the amplifiers 74, 76, 78 and 80 are connected to an electronically programmable IF switch 82. The output of the IF switch 82 is connected to electronically programmable tuners 84, 86, 88 and 90. Local oscillators 92 are connected to each of the tuners 84, 86, 88 and 90 for allowing the tuners to select the IF frequency and down convert the bandwidth of interest to the final IF center frequency. Each of the front-ends 74, 76, 78 and 80 can be connected to any combination of tuners 84, 86, 88 and 90. This is an important aspect of the invention because each of the tuners 84, 86, 88 and 90 correspond to one sector of the channelized receiver. Each of the sectors as previously discussed has 24 channels each of which has its own bandwidth which represents 1/24th of the bandwidth output of its associated tuner. Therefore, antenna 66 and its associated front-end can be connected to any combination of sectors. In this manner, sector bandwidth can be programmably controlled as desired for the particular mission involved. For instance, one quadrant of the airplane can be connected to 24 channels, 48 channels, 72 channels or 96 channels. Other options include connecting each of two adjacent sectors to 48 channels which could be used to give one side of the plane superior bandwidth over a 180° range.

All outputs of the channelizers 94, 96, 98 and 100 are connected to logrithmic amplifier detectors 101. At this point it is important to note that the channelizers convert the bandwidth of the tuners from I channel to 24 separate channels that equally divide the bandwidth output of the tuners. Therefore, there are 96 logrithmic amplifier detectors 101 which are connected to channelizers 94, 96, 98 and 100. Similarly, there are 96 A/D converters 102 and 96 pulse detectors 104. There are also 96 arbitration modules 106 which are used to arbitrate between both channels and sectors. Both channel and sector arbitration was discussed with reference to FIG. 3. The digital approach allows arbitrations to take place between neighboring channels and between each of the sectors. The sector arbitration is spatially oriented and the channel arbitration is frequency oriented. The channel arbitration is designed to eliminate rabbit-ears and noise induced signals and the sector arbitration is designed to eliminate backlobe problems as well as spill-over energy from a signal that is received in more than one sector. Since there is only one emitter source, only one pulse will be selected after the arbitration is complete.

The A/D converter 102 converts pulse amplitude information to a digital signal which represents the instantaneous amplitude present in the channel. This instantaneous amplitude is sampled on a periodic basis such as every 20 nanoseconds or every 50 nanoseconds. The digital processing of these signals allows simultaneous digital arbitration which eliminates a great number of spurious signals and insures that reported pulse descriptor words will contain important information about real signals that have been received. After the arbitration is complete, the digital information representing the received pulse is transferred to the parameter measurement block 110. This block determines the TOA, PA and TOD of a particular signal. This determination is made in real time which allows accurate and consistent representation of those parameters. There are 96 of the parameter measurement modules 110. Parameter calculations such as AOA, F, PW and PRI are made in parameter calculator 112. In addition, each parameter calculator can perform an environment filter function. The environment filter screens output PDW's for signals of interest and rejects signals not of interest. At this stage in the architecture the 96 outputs of the parameter measurement modules 110 are combined in fours to produce, for example, 24 outputs. Eight of these outputs are combined together and there are three parameter calculation modules 112 each having eight inputs and one output. The parameter calculators are not required to calculate their pulse parameters in real time in order to reduce the number of resources thereby reducing cost, weight and power. The parameter calculators 112 connect in cascade either as a funnel or as a parameter calculator. When they are used as a calculator they are used to determine the AOA, F, PW and PRI of a pulse and to screen pulses by the environment filter. When they are used as a funnel, they are used to consolidate the outputs of the quad combined parameter measurement modules 110. Each of the parameter calculators 112 has eight inputs and one output. The outputs of the 24 quad combined parameter measurement modules 110 are connected to three parameter calculators 112 each having eight inputs and one output. The outputs of the three parameter calculators 112 are connected to another parameter calculator 112. A way of consolidating the outputs of the pulse measurement modules 110 and parameter calculators 112 is shown in FIG. 7.

Figure 7:
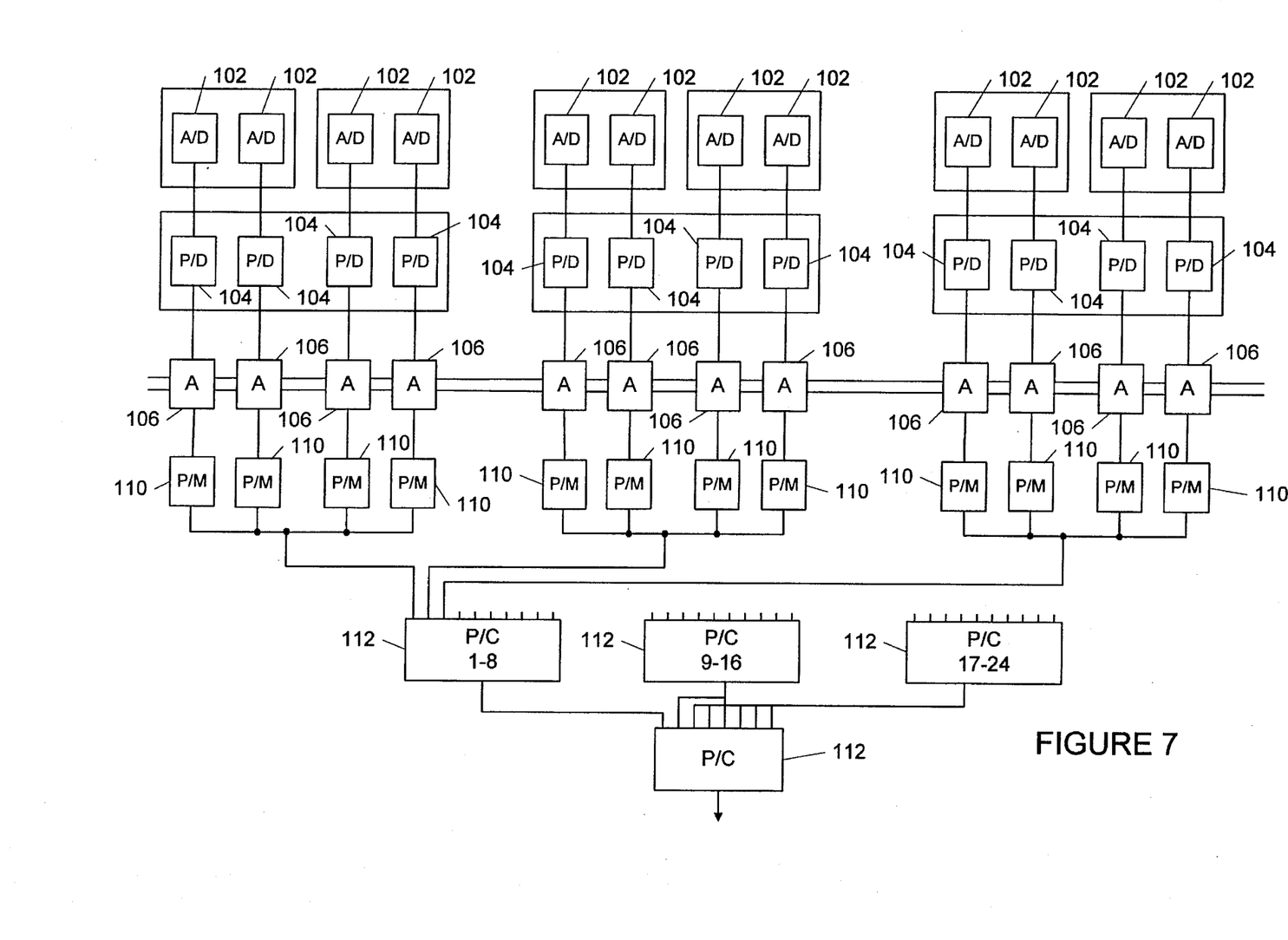
FIG. 7 is a block diagram showing a particular configuration for combining channel information for the channelized receiver of the present invention.

FIG. 7 shows 12 of the A/D converts 102, the pulse detectors 104, the arbitration modules 106 and the pulse measurement modules 110.

FIG. 7 shows the 96 parameter measurement modules 110 are consolidated into four parameter calculators 112. As stated before, the parameter calculators 112 can act either as a funnel or as a calculator. When they are acting as a funnel they are multiplexing the pulse information received from the pulse measurement modules 110 and consolidating it by multiplexing the information. Pulse calculations can occur at any and all levels of the system. The tradeoffs involved are that less bandwidth is involved at levels closer to the pulse measurement modules 110. This allows higher resolution for calibration of the parameter calculation functions. However, this method also requires significantly more data to be down-loaded at all levels increasing programming and change-over time for the system.

The unique aspects of this receiver architecture are its all-digital processing of amplitude data and its ability to stack sectors with either 24, 48, 72 or 96 channels. The other unique aspect of this architecture is the ability to separate real time calculations of TOA, PA and TOD from non-real time calculations of AOA, F, PW and PRI and environment filtering. The all-digital approach allows simultaneous arbitration in real time for all sectors and channels which greatly reduces the number of pulse descriptor words giving the receiver both a high probability of intercept and a low false alarm rate.

It is believed that the foregoing description or the preferred embodiment of the invention is sufficient in detail to enable one skilled in the art to make and use the invention. However, it is expressly understood that the details of the elements that are presented are not intended to limit the scope of the invention inasmuch as equivalence to those elements and other modifications thereof all of which come within the scope of the invention, become apparent to those skilled in the art upon reading this specification. Thus, the invention is to be broadly construed within the full scope of the appended claims.

What is claimed is:

1. A channelized receiver comprising:

at least two front-end means each front-end means having an input and an output, said inputs for connection to antenna means, IF switch means having at least two inputs and two outputs, said inputs for connection to the outputs of said front-end means, at least two tuners, each tuner having an input and an output, the input of said tuner means connected to the outputs of said IF switch means, at least two channelized means, each channelized means having an input and multiple outputs, said inputs of said channelized means are individually connected to the outputs of said tuner means, said channelized means for dividing the frequency spectrum output from said tuner means into individual channels, the outputs of said channelized means being connected to a logarithmic amplifier means having an input and an output, the output of said logarithmic amplifier means connected to an A/D converter for converting the output of said logarithmic amplifier means to a digital signal, pulse detection means connected to said A/D converter for digitally detecting when pulses are present in said individual channels, frequency and sector arbitration means connected to said pulse detector means for identifying at least one pulse signal in a first individual channel and for eliminating a spurious signal caused by at least one of frequency and spatial noise in a second individual channel, said frequency and sector arbitration means and said pulse detection means operating to digitally identify said at least one pulse signal and to eliminate said spurious signal in real time.

2. The channelized receiver of claim 1 wherein said IF switch is programmable, said IF switch means for electronically connecting either front-end means to any combination of said tuner means.

3. The channelized receiver of claim 2 wherein:

said tuner means are electronically programmable for electronically selecting the bandwidth output of said tuner means.

4. The channelized receiver of claim 3 including:

parameter measurement means for determining in real time pulse parameters, said parameter measurement means being connected to the output of said frequency and sector arbitration means.

5. The channelized receiver of claim 4 including:

pulse calculation means connected to the output of said parameter measurement means for calculating pulse parameters in non-real time, said pulse calculation means having a plurality of inputs and a single output, the polarity of inputs for connection to a plurality of outputs of said pulse measurement means, the output of said pulse calculation means for outputting a pulse descriptor word having information about signals received by said antenna means.

6. A parameter encoder system comprising:

first antenna means directed in a first spatial direction for receiving first radio frequency (RF) signals;

second antenna means directed in a second spatial direction for receiving second RF signals;

matrix means, coupled to said first and second antenna means and having first and second inputs and first and second outputs, for selectively connecting at least one of said first input and said second input to at least one of said first output and said second output; and tuning means coupled to said first and second outputs of said matrix means and having a first plurality of channels which cover a first frequency spectrum and a second plurality of channels which cover a second frequency spectrum, whereby said matrix means and said tuning means allow said channelized receiver to be selectively configured in a first configuration to analyze the first and second RF signals using said first and second frequency spectrums, and in a second configuration to analyze one of said first and second RF signals using both said first and second frequency spectrums.

7. A parameter encoder system comprising:

antenna means directed in a first spatial direction for receiving first radio frequency (RF) signals therefrom;

tuning means, coupled to said antenna means, for dividing said first RF signals into a first plurality of adjacent channels;

amplifying and converting means, coupled to said tuning means, for amplifying channel signals output by said first plurality of adjacent channels and for converting said channel signals to digital channel signals;

pulse detection means, coupled to said amplifying and converting means, for detecting pulses in said digital channel signals; and frequency arbitration means, coupled to said pulse detection means, for identifying a first pulse signal and for eliminating a second pulse signal caused by frequency noise.

8. A parameter encoder system comprising:

first antenna means directed in a first spatial direction for receiving first radio frequency (RF) signals therefrom;

second antenna means directed in a second spatial direction for receiving second RF signals therefrom;

tuning means, coupled to said first and second antenna means, for dividing said first RF signal into a first plurality of channel signals for dividing said second RF signal into a second plurality of channel signals;

amplifying and converting means, coupled to said tuning means, for amplifying said first and second plurality of channel signals and for converting said first and second plurality of channel signals into a first and second plurality of digital channel signals;

pulse detection means, coupled to said amplifying and converting means, for detecting pulses in said first and second plurality of digital channel signals; and sector arbitration means, coupled to said pulse detection means, for identifying a first pulse signal in a first channel of said first plurality of channels and for eliminating a second pulse signal, caused by spatial noise, in a second channel of said second plurality of channels.

9. A channelized receiver comprising:

first antenna means directed in a first spatial direction for receiving first radio frequency (RF) signals;

second antenna means directed in a second spatial direction for receiving second RF signals;

matrix means, coupled to said first and second antenna means and having first and second inputs and first and second outputs, for selectively connecting at least one of said first input and said second input to at least one of said first output and said second output; and tuning means coupled to said first and second outputs of said matrix means and having a first plurality of channels which cover a first frequency spectrum and a second plurality of channels which cover a second frequency spectrum, whereby said matrix means and said tuning means allow said channelized receiver to be selectively configured in a first configuration to analyze the first and second RF signals using said first and second frequency spectrums, and in a second configuration to analyze one of said first and second RF signals using both said first and second frequency spectrums.

10. The channelized receiver of claim 9 wherein said tuning means includes first and second tuners.

11. The channelized receiver of claim 9 further comprising:

amplifying means having an input coupled to said first and second antenna means and an output coupled to said tuning means, for amplifying said first and second RF signals.

12. The channelized receiver of claim 9 wherein said first and second frequency spectrums are electronically selectable.

13. The channelized receiver of claim 9 wherein connections provided between said first and second inputs and said first and second outputs of said matrix means can be selected electronically.

14. The channelized receiver of claim 9 wherein when said channelized receiver is in said second configuration, the first and second frequency spectrums are adjacent frequency spectrums.

15. The channelized receiver of claim 9 further comprising:

amplifying means, coupled to said first and second plurality of channels, for amplifying channel signals from said first and second plurality of adjacent channels;

converting means, coupled to said amplifying means, for converting said channel signals output by said amplifying means into digital channel signals; and pulse detection means, coupled to said converting means, for detecting pulses in said digital channel signals.

16. The channelized receiver of claim 15 further comprising:

frequency arbitration means, coupled to said pulse detection means, for identifying a first pulse in a first channel of said first plurality of channels and for eliminating a second pulse caused by frequency noise in a second channel of said first plurality of channels, wherein said first and second channels are adjacent channels.

17. The channelized receiver of claim 16 further comprising:

sector arbitration means, coupled to said pulse detection means, for further identifying said first pulse signal in said first channel and for eliminating a third pulse signal caused by spatial noise in a third channel of said second plurality of channels.

18. The channelized receiver of claim 17 wherein said first and third channels have approximately the same frequency.

19. The channelized receiver of claim 16 further comprising:

parameter measuring means, coupled to said frequency arbitration means, for calculating a plurality of pulse parameters in real time.

20. The channelized receiver of claim 19 wherein said plurality of pulse parameters include time of arrival (TOA), time of departure (TOD), and angle of arrival (AOA).

21. A channelized receiver comprising:

antenna means directed in a first spatial direction for receiving first radio frequency (RF) signals therefrom;

tuning means, coupled to said antenna means, for dividing said first RF signals into a first plurality of adjacent channels;

amplifying and converting means, coupled to said tuning means, for amplifying channel signals output by said first plurality of adjacent channels and for converting said channel signals to digital channel signals;

pulse detection means, coupled to said amplifying and converting means, for detecting pulses in said digital channel signals; and frequency arbitration means, coupled to said pulse detection means, for identifying a first pulse signal and for eliminating a second pulse signal caused by frequency noise.

22. The channelized receiver of claim 21 wherein said frequency arbitration means compares amplitudes of digital channel signals in at least two adjacent channels of said first plurality of adjacent channels to identify said first pulse signal.

23. The channelized receiver of claim 21 wherein said frequency arbitration means identifies third and fourth time-coincident pulses in first and second channels, said first and second channels being adjacent, and eliminates a fifth pulse caused by frequency noise in a third channel adjacent said first channel and a sixth pulse caused by frequency noise in a fourth channel adjacent said second channel.

24. A channelized receiver comprising:

first antenna means directed in a first spatial direction for receiving first radio frequency (RF) signals therefrom;

second antenna means directed in a second spatial direction for receiving second RF signals therefrom;

tuning means, coupled to said first and second antenna means, for dividing said first RF signal into a first plurality of channel signals and for dividing said second RF signal into a second plurality of channel signals;

amplifying and converting means, coupled to said tuning means, for amplifying said first and second plurality of channel signals and for converting said first and second plurality of channel signals into a first and second plurality of digital channel signals;

pulse detection means, coupled to said amplifying and converting means, for detecting pulses in said first and second plurality of digital channel signals; and sector arbitration means, coupled to said pulse detection means, for identifying a first pulse signal in a first channel of said first plurality of channels and for eliminating a second pulse signal, caused by spatial noise, in a second channel of said second plurality of channels.

25. A method of controlling a channelized receiver comprising the steps of:

receiving first radio frequency (RF) signals from a first spatial direction;

receiving second RF signals from a second spatial direction;

selecting first and second frequency spectrums for a tuner having a first and second plurality of channels;

selectively connecting said first and second RF signals to said tuner through a matrix switch, whereby said matrix switch and said tuner allow said channelized receiver to be selectively configured in a first configuration to analyze said first RF signals with said first frequency spectrum and said second RF signals with said second frequency spectrum, and in a second configuration to analyze one of said first and second RF signals using both said first and second frequency spectrums.

26. The method of claim 25 further comprising the steps of:

tuning said first and second frequency spectrums as adjacent frequency spectrums when said channelized receiver is in said second configuration.

27. A method of controlling a channelized receiver comprising the steps of:

receiving first radio frequency (RF) signals;

selecting a first frequency spectrum for a first tuner, said first frequency spectrum comprising a first plurality of adjacent channels;

transmitting said first RF signals to said first tuner, said tuner generating a first plurality of channel signals corresponding to said first plurality of adjacent channels;

converting said first plurality of channel signals to a first plurality of digital channel signals;

detecting pulses in said first plurality of digital channel signals; and identifying a first pulse signal in a first channel of said first plurality of channels and eliminating a second pulse signal in a second channel of said first plurality of channels caused by frequency noise.

28. A method of controlling a channelized receiver comprising the steps of:

receiving first and second radio frequency (RF) signals from first and second spatial directions;

selecting first and second frequency spectrums for a tuner, said first and second frequency spectrums comprising a first and second plurality of adjacent channels;

transmitting said first and second RF signals to said tuner, said tuner generating a first and second plurality of channel signals corresponding to said first and second plurality of adjacent channels;

converting said first and second plurality of channel signals to a first and second plurality of digital channel signals;

detecting pulses in said first and second plurality of digital channel signals; and identifying a first pulse signal in a first channel of said first plurality of channels and eliminating a second pulse signal in a second channel of said second plurality of channels caused by spatial noise.

* * * * *